(12) United States Patent  
Sakai

(10) Patent No.: US 7,068,408 B2  
(45) Date of Patent: *Jun. 27, 2006

(54) OPTICAL APPARATUS AND LASER DISPLAY APPARATUS HAVING LASER BEAM SCANNER EACH

(75) Inventor: Yoshitsugu Sakai, Kanagawa (JP)

(73) Assignee: Sony Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/113,280

(22) Filed: Apr. 25, 2005

(65) Prior Publication Data

US 2005/0190422 A1 Sep. 1, 2005

Related U.S. Application Data

(63) Continuation of application No. 10/878,333, filed on Jun. 29, 2004, now Pat. No. 6,903,857.

(30) Foreign Application Priority Data

Jul. 9, 2003 (JP) ............................ P2003-194648

(51) Int. Cl.  
*G02B 26/08* (2006.01)

(52) U.S. Cl. .................. 359/212; 359/214; 250/559.37  
(58) Field of Classification Search ................ 359/212, 359/215, 223; 250/559.29, 559.37  
See application file for complete search history.

(56) References Cited

FOREIGN PATENT DOCUMENTS

JP 2000-194302 7/2000

*Primary Examiner*—James Phan  
(74) *Attorney, Agent, or Firm*—Rader, Fishman & Grauer PLLC; Ronald P. Kananen

(57) ABSTRACT

An optical apparatus is disclosed which has a scanner for scanning a predetermined area with a laser beam. The optical apparatus comprises: a laser source; a scanner having a scanning mirror for causing a laser beam generated by the laser source to scan; an angle sensor for sensing angles of the scanning mirror of the scanner; a fault detection block for determining whether the scanning mirror operates safely and normally based at least on angle information coming from the angle sensor; and a projection control block for controlling projection of the laser beam based on fault detection information coming from the fault detection block.

1 Claim, 18 Drawing Sheets

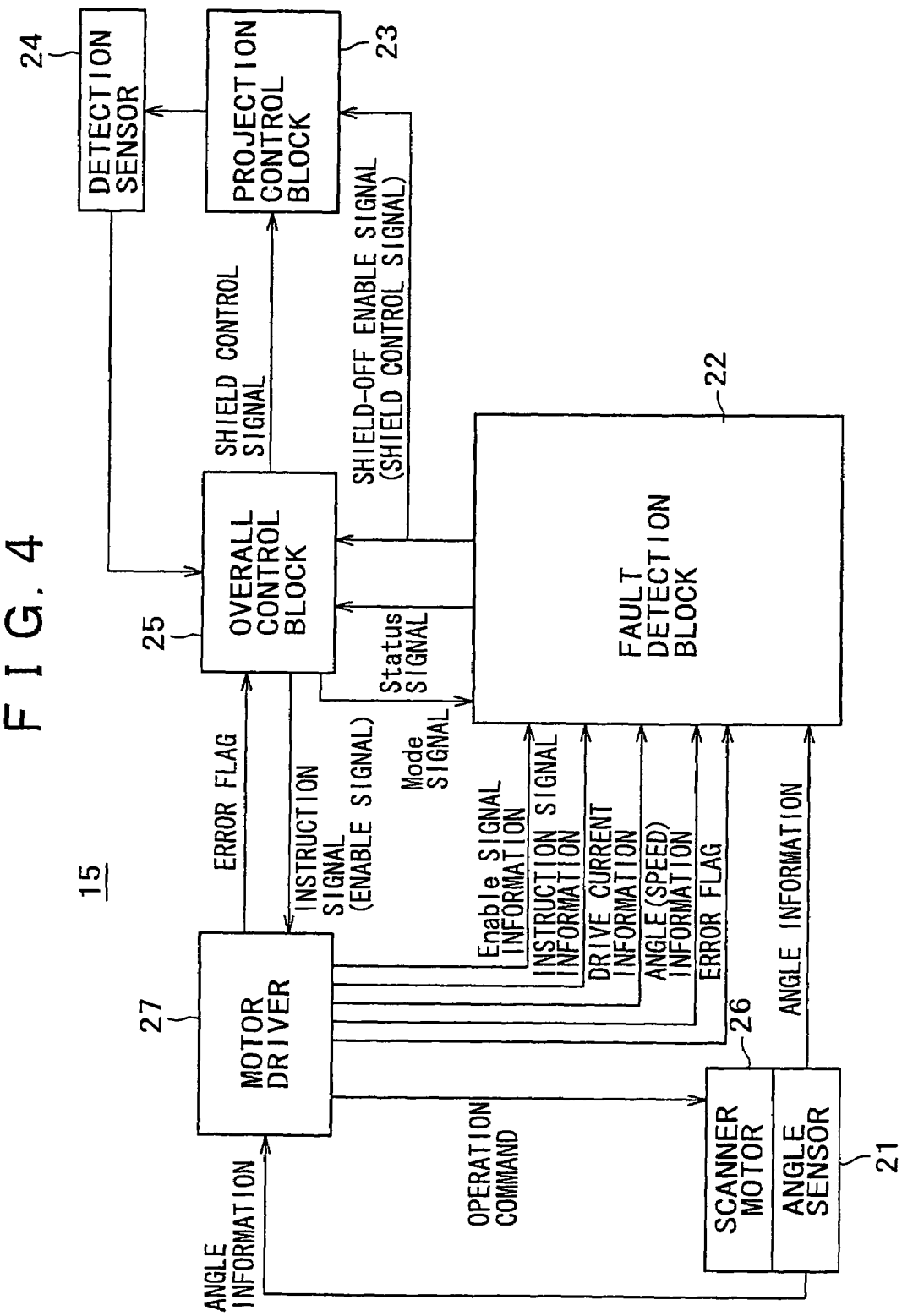

ANGLE

SPEED

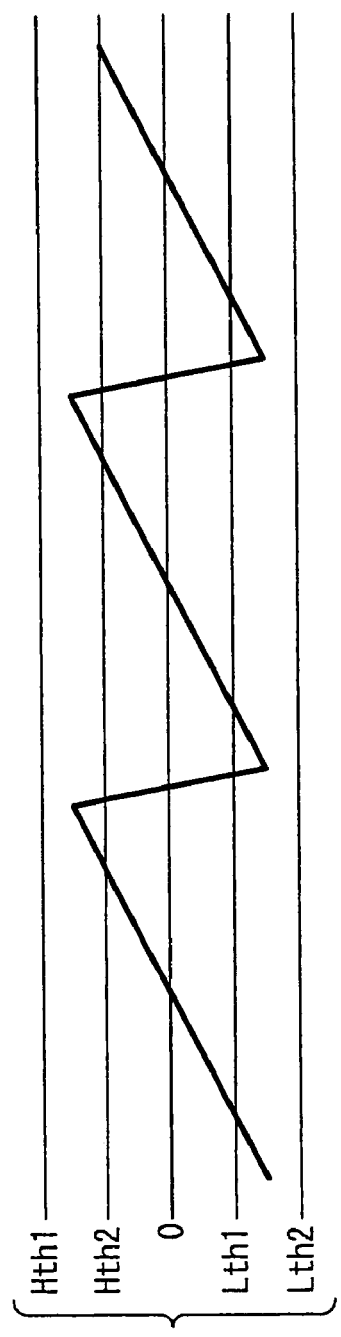
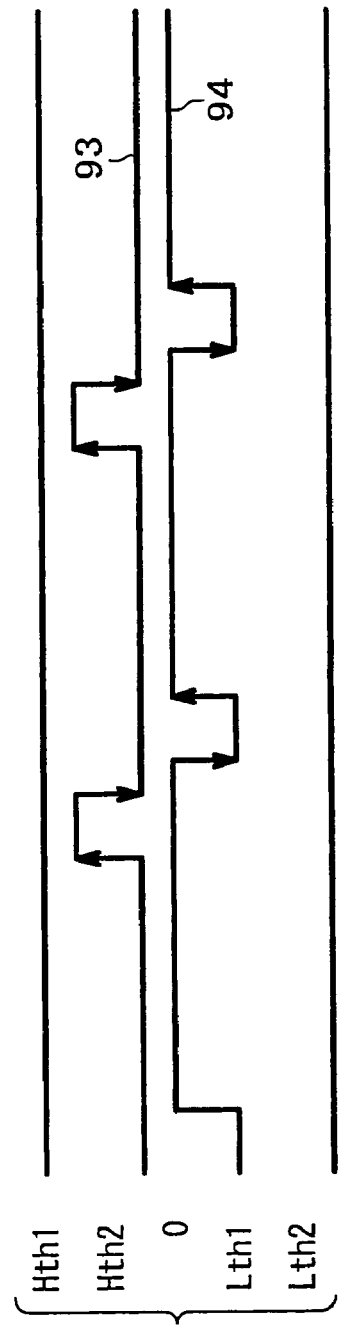
FIG. 10A
FIG. 10B

OPTICAL APPARATUS AND LASER DISPLAY APPARATUS HAVING LASER BEAM SCANNER EACH This application is a continuation application of U.S. patent application Ser. No. 10/878,333 filed Jun. 29, 2004, now U.S. Pat. No. 6,903,857, issued on Jun. 7, 2005, the entire content being incorporated by reference.

BACKGROUND OF THE INVENTION

The present invention relates to an optical apparatus and a laser display apparatus each having a laser beam scanner.

Today, devices and apparatuses handling laser beams are required to comply with rigorous safety standards. The equipment utilizing laser beams includes light show devices and bar code readers used by POS (point of sale) systems. Each of these devices is furnished illustratively with a scanner for scanning a target area with a laser beam.

Another typical laser beam device is a display apparatus as part of theater-use projection equipment for projecting images to be viewed by a large audience. In order to acquire a brightly projected image on a large screen, the display apparatus first forms a one-dimensional optical image using one-dimensional light modulators and then causes the optical image thus formed to be scanned perpendicularly for projection, whereby a two-dimensional optical image is projected.

Where the one-dimensional optical image is scanned so as to acquire the two-dimensional projected image, a high-powered laser beam is directed at the screen. Because this laser beam is emitted externally, it is subject to strict safety standards.

In display apparatuses such as scanner-equipped projectors, the scanner could be stopped for some reason. In such a case, the dose of the laser beam per unit projected area could largely exceed normal levels, posing a threat to safety.

Laser scanner-equipped projection display apparatuses designed for higher safety have been proposed. One such apparatus is disclosed illustratively in Japanese Patent Laid-open No. 2000-194302 (as claimed in claim 3 and described in particular in Paragraph p. 20, 1.24 to p. 21, 1.15).

The projection display apparatus proposed by the above-cited patent application detects the scan timing of the scanner during operation. If the detected timing is found to deviate from reference timing, scanning with the laser beam is stopped. It should be noted that the preferred scanning means for the proposed apparatus is a polygon scanner that rotates at a constant velocity.

There also exist optical and display apparatuses which utilize galvanometer scanners. Unlike polygon mirrors rotating at a constant speed in a fixed direction, the galvanometer scanner makes a reciprocal rotary motion that has a predetermined amplitude, a constant cycle, and a fixed rotation pattern but not a steady speed.

The present invention has been made in view of the above circumstances and provides a laser display apparatus having a scanning safeguard system. This system stops laser beam emission upon detection of a scanner being stopped abnormally for whatever reason, so that the dose of the laser beam will not exceed safety standards. The inventive safeguard system works not only with the polygon mirror setup where the scanner (i.e., mirror) rotates at a constant speed, but also with the galvanometer mirror arrangement in which the mirror moves in reciprocating motion for scan.

SUMMARY OF THE INVENTION

In carrying out the invention and according to a first aspect thereof, there is provided an optical apparatus having a scanner for scanning a predetermined area with a laser beam, the optical apparatus comprising: a laser source; the scanner having a scanning mirror for causing a laser beam generated by the laser source to scan; an angle sensor for sensing angles of the scanning mirror of the scanner; a fault detection block for determining whether the scanning mirror operates safely and normally based at least on angle information coming from the angle sensor; and a projection control block for controlling projection of the laser beam based on fault detection information coming from the fault detection block.

Preferably, the optical apparatus according to the first aspect of the invention may further comprise a diagnosis function for determining upon power-up whether the angle sensor, the fault detection block, and the projection control block function normally.

With the above-outlined optical apparatus in operation, the fault detection block may detect a scanner system failure based on the information sensed by the angle sensor. In that case, the projection control block controls laser beam emission so that the dose of the laser beam emitted externally will not exceed the dose level stipulated for the laser class to which the apparatus belongs.

The inventive optical apparatus monitors scanning safeguard status by use of a detection sensor verifying that the projection control block operates normally. The apparatus also uses a motor driver to detect a faulty state in an overall control block and a motor driver block implementing the diagnosis function, whereby a reliable safeguard feature is realized.

According to a second aspect of the invention, there is provided a laser display apparatus having a scanner for scanning a predetermined area with a laser beam, the laser display apparatus comprising: a laser source; a light modulator for modulating a laser beam generated by the laser source; the scanner having a scanning mirror for causing the laser beam modulated by the light modulator to scan; an angle sensor for sensing angles of the scanning mirror of the scanner; a fault detection block for determining whether the scanning mirror operates safely and normally based at least on angle information coming from the angle sensor; and a projection control block for controlling projection of the laser beam based on fault detection information coming from the fault detection block.

Preferably, the laser display apparatus according to the second aspect of the invention may further comprise a diagnosis function for determining upon power-up whether the angle sensor, the fault detection block, and the projection control block function normally.

With the above-outlined laser display apparatus in operation, the fault detection block may detect a scanner system failure based on the information sensed by the angle sensor. In that case, the projection control block controls laser beam emission so that the dose of the laser beam emitted externally will not exceed the dose level stipulated for the laser class to which the apparatus belongs.

The inventive laser display apparatus monitors scanning safeguard status by use of a detection sensor verifying that the projection control block operates normally. The apparatus also uses a motor driver to detect a faulty state in an overall control block and a motor driver block implementing the diagnosis function, whereby a reliable safeguard feature is realized.

BRIEF DESCRIPTION OF THE DRAWINGS

Further objects and advantages of this invention will become apparent upon a reading of the following description and appended drawings in which:

FIG. 4 is a schematic block diagram of a scanning safeguard system for use by an optical apparatus according to the invention;

FIGS. 10A and 10B are waveform charts plotting angle information output by the scanning mirror and depicting a signal waveform representative of the output angle information with regard to predetermined threshold levels Hth1, Hth2, Lth1, and Lth2;

DESCRIPTION OF THE PREFERRED EMBODIMENTS

Figure 1:
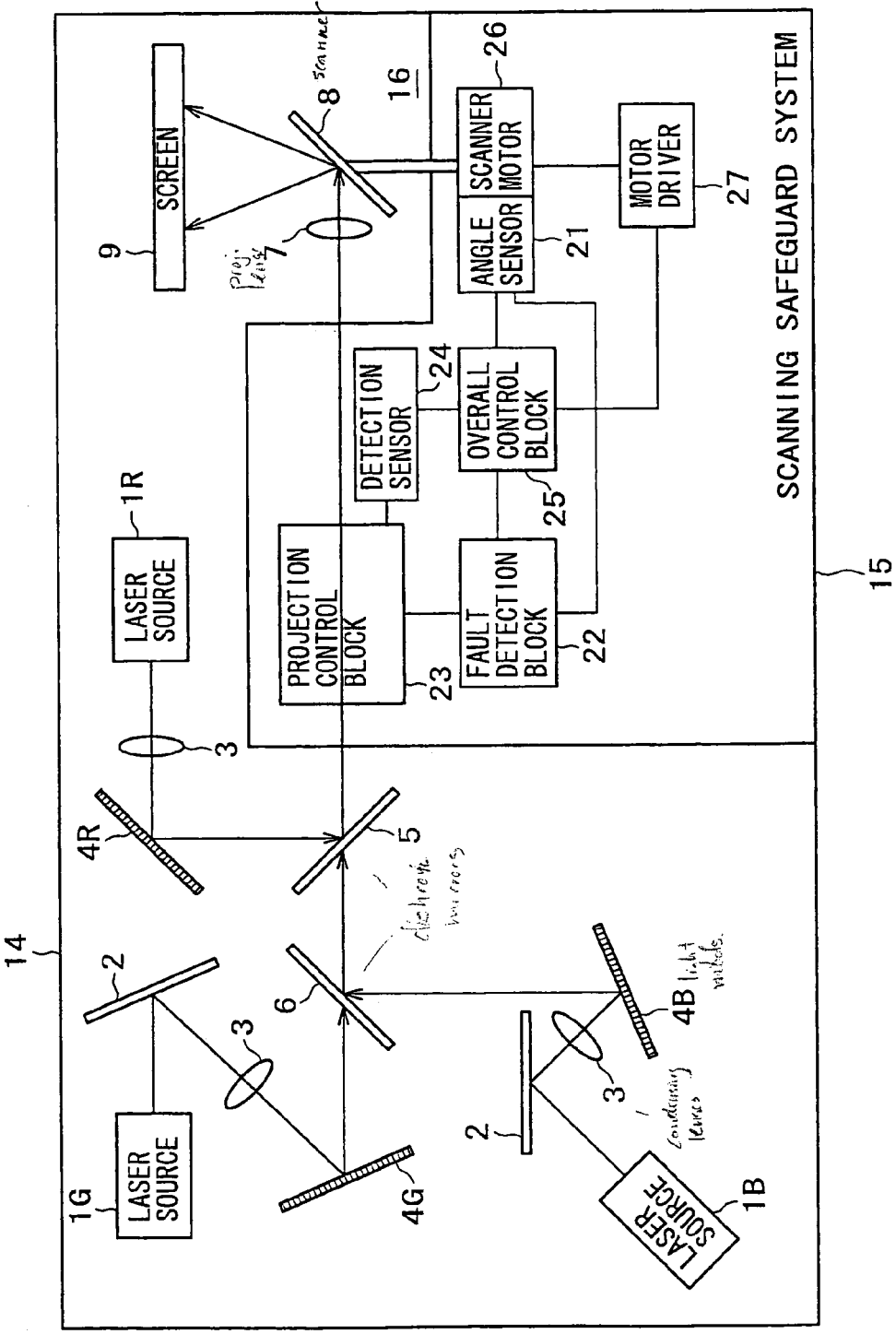
FIG. 1 is a schematic block diagram of a laser display apparatus according to the invention.

Described below with reference to the schematic block diagram of FIG. 1 is a projection apparatus accommodating an optical apparatus 16 and a laser display apparatus 14 each equipped with a laser beam scanner according to the invention. The setup of FIG. 1 includes: laser sources 1R, 1G and 1B generating laser beams of red, green and blue respectively; condensing lenses 3 furnished in combination with the laser sources; and light modulators 4R, 4G and 4B composed of GLV (grating light valve) each and used to obtain a one-dimensional projected optical image.

Optical images modulated by the light modulators 4R, 4G and 4B in keeping with a projected optical image are merged by dichroic mirrors 5 and 6. The merged image reaches a scanner 8 through a projection lens 7. With its reflected light, the scanner 8 scans a screen 9.

Figure 2:
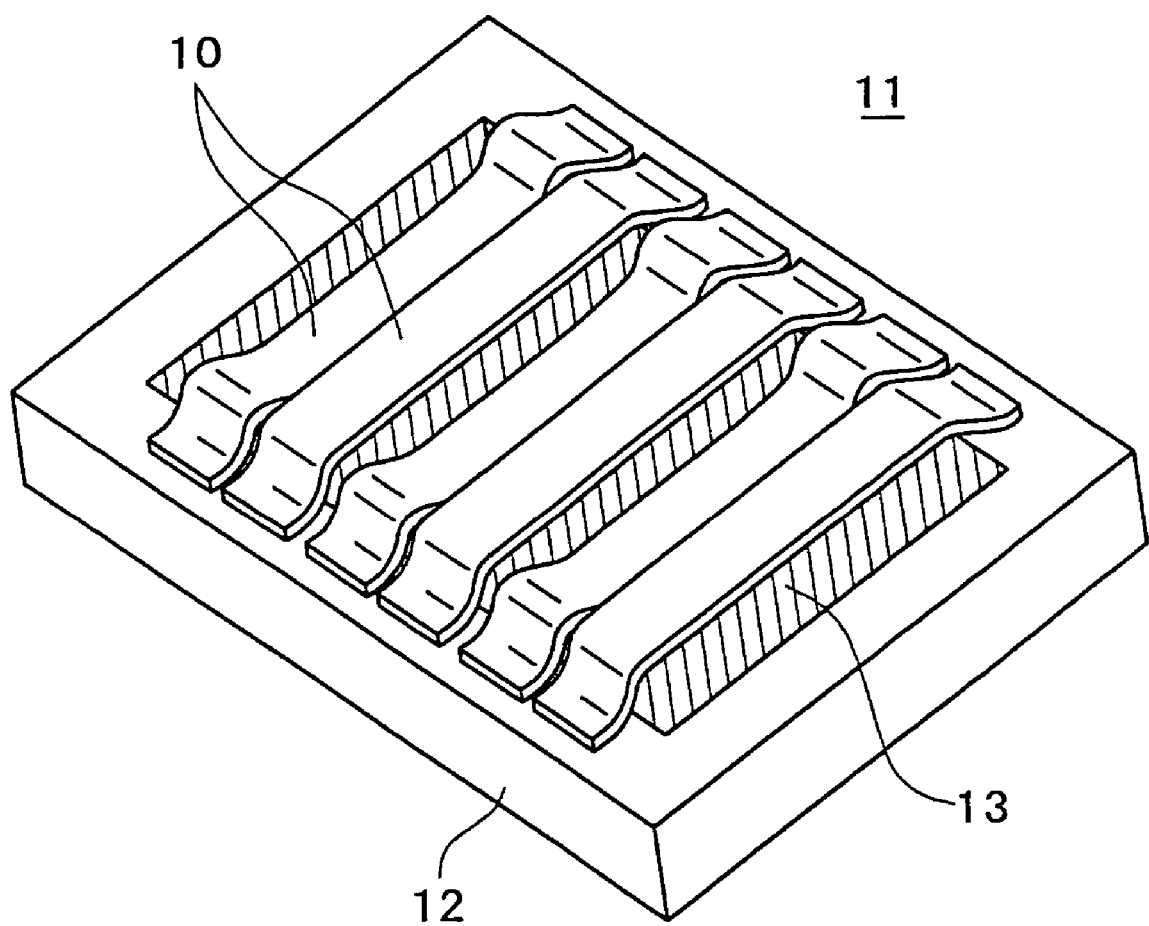
FIG. 2 is a schematic perspective view indicating key parts of a light modulator for use by the laser display apparatus.

The light modulators 4R, 4G and 4B are typically constituted either by a blazed type optical diffraction grating or by GLV made of a micro ribbon optical diffraction grating. As shown in FIG. 2, the GLV makeup comprises a plurality of pixels 11 (e.g., 1,088 units) arranged one-dimensionally, each pixel being formed illustratively by a diffraction grating made up of six parallelly arranged micro ribbons 10.

Figure 3:
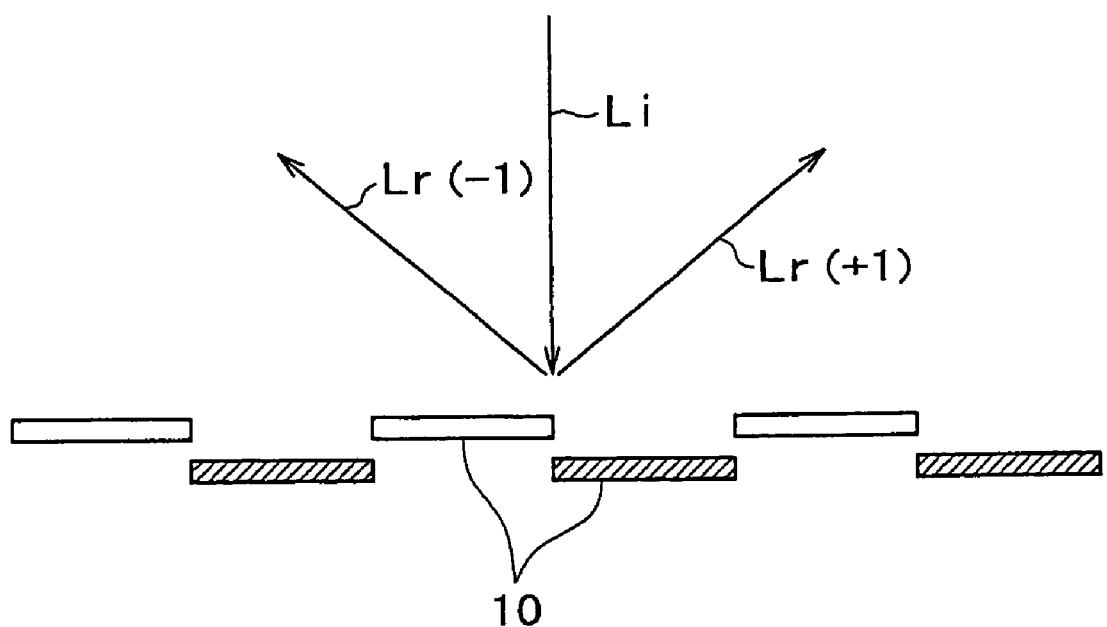
FIG. 3 is an explanatory view showing how the light modulator works.

In each pixel 11, a counter electrode 13 is positioned on a substrate 12 under the micro ribbons 10 in a manner having a predetermined clearance from, and commonly opposed to, the micro ribbons 10. Illustratively, a predetermined voltage is applied between every other micro ribbon 10 and the counter electrode 13. The voltage application causes the middle portion of each voltage-affected ribbon 10 to move into a predetermined distance relative to the substrate 10 and stay there. As shown schematically in FIG. 3, incident light Li entering the micro ribbons 10 of each pixel, i.e., a beam coming from one of the laser sources 1R, 1G and 1B, produces primary diffracted light beams Lr(+1) and Lr(−1). In this manner, the light from each of the laser sources 1R, 1G and 1B is modulated by the GLV-based light modulators 4 into positive and negative primary diffracted light whose presence or absence or whose degrees in intensity are controlled as needed.

A one-dimensional optical image produced by the light modulators 4R, 4G and 4B through modulation and merging is scanned by the scanner 8 perpendicularly to a one-dimensional direction (e.g., scanned horizontally) on the screen 9. The scan generates a two-dimensional optical image that is projected onto the screen 9.

In FIG. 1, reference numeral 2 stands for mirrors that cause laser beams from the laser sources 1G and 1B to pass through the condensing lenses 3 before entering the light modulators 4G and 4B respectively. In the above-mentioned setup where horizontal scanning is effected, the scanner 8 is formed illustratively by a scanning mirror such as a galvanometer mirror rotating reciprocally around a perpendicular axis.

Described below with reference to the schematic block diagram of FIG. 4 is a scanning safeguard system 15 that controls the inventive optical apparatus having a laser beam scanner to comply with safety standards. The scanning safeguard system 15 includes: an angle sensor 21 for sensing mirror angles of the scanner 8; a fault detection block 22 for determining whether the scanning mirror operates normally and safely; a projection control block 23 for controlling the externally directed laser beam emission; a detection sensor 24 for detecting signals output by the projection control block 23; an overall control block 25 for supplying illustratively a shield control signal to the projection control block 23; a motor driver 27 receiving signals from the overall control block 25; and a scanner motor 26 for rotating the scanning mirror of the scanner 8 under instructions from the motor driver 27.

The angle sensor 21 is attached illustratively to the scanner motor 26 rotating the scanner. In operation, the angle sensor 21 senses rotation angles of the motor in order to determine the angle of scanner mirror rotation, and forwards a detection signal reflecting the detected angle to the fault detection block 22.

The angle sensor 21 is formed illustratively by a capacitance-operated angle sensor attached to the scanner motor 26. However, the angle sensor is not limited to the capacitance type. The sensor may be of any one of diverse types including an encoder sensor, an optical position sensor, a sensor for sensing the rotating shaft of a motor or a mirror, and a mirror surface sensor.

The projection control block 23 receives the shield control signal primarily from the overall control block 25 so as to control the presence or absence of the laser beam or its dose during laser beam projection. Illustratively, the projection control block 23 modifies the laser beam path by controlling the scanner mirror, and shields the projected light using mechanical shutters. Furthermore, the projection control block 23 controls modulation levels of the light modulators 4R, 4G and 4B (FIG. 1); stops laser oscillation; or stops the supply of currents to laser diodes (LD).

Figure 5A:
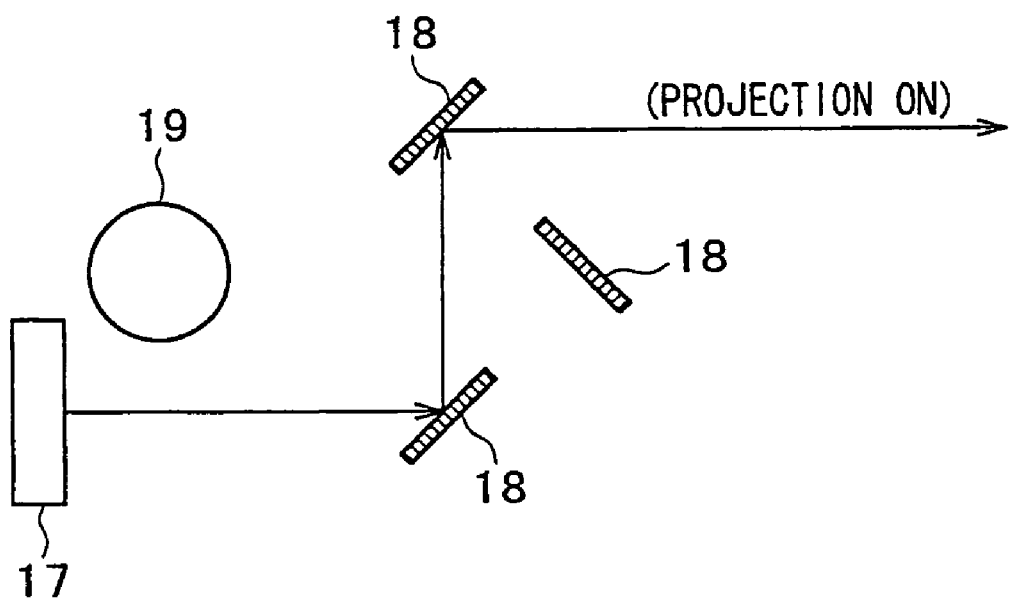
FIGS. 5A and 5B are schematic views showing how the presence or absence of laser beam emission is detected and how the dose of the emission is controlled.
Figure 5B:
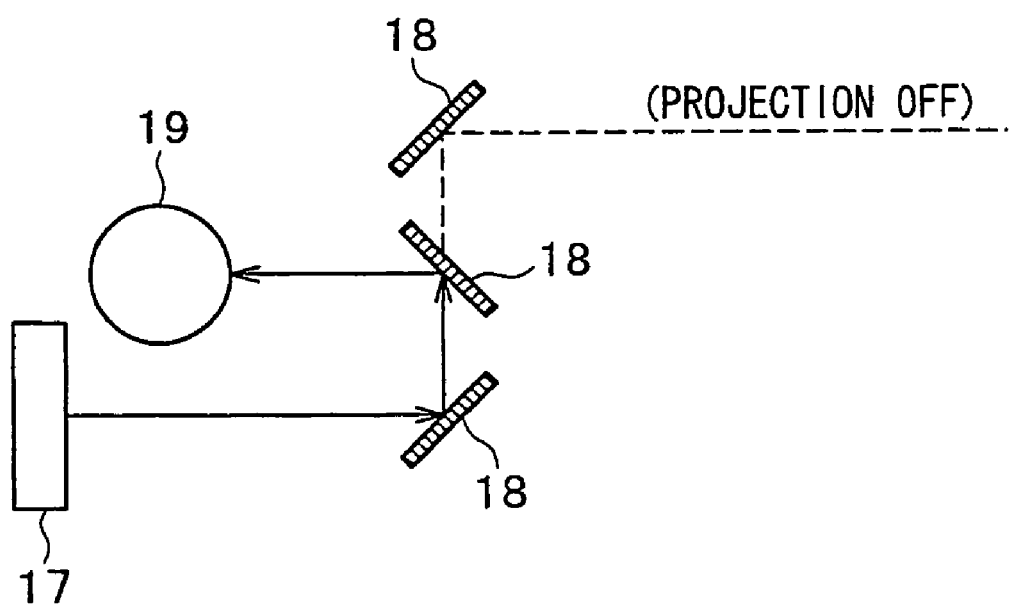

The controls above may also be effected using mirrors and an integrating sphere as shown in FIGS. 5A and 5B. Normally, as depicted in FIG. 5A, a plurality of mirrors 18 are located in such relations to one another that they will not shield the laser beam projection. Upon receipt of a shield control signal indicative of a detected fault, the mirrors 18 are moved into such relations to one another that the laser beam projection is shut down and the laser beam is guided to the integrating sphere. The action not only shields the laser beam (projected light) but also verifies deactivation of the beam emission through measurement with the integrating sphere.

The detection sensor 24 checks primarily to see whether the projection control block 23 functions normally. This is a sensor designed mainly to ascertain the workings of the projection control block 23. When the projection control signal is compared with the result of detection by the detection sensor 24, the projection control block 23 can be monitored for any faulty operation. The sensing of the detection sensor 24 is brought about illustratively by measuring the dose of the projected laser beam or by observing positional relations between the moving components involved.

The overall control block 25 exercises overall control on the inventive optical apparatus and the inventive laser display apparatus incorporating the optical apparatus. Illustratively, the overall control block 25 receives various kinds of signal information such as instruction signal information and drive current information from the fault detection block 22, and uses the received information as a basis for giving an instruction signal or an enable signal to the motor drive 27 as needed. In turn, the motor driver 27 issues operation instructions to the scanner motor 26 for mirror control purposes.

The overall control block 25 further uses the diverse kinds of signal information such as instruction signal information and drive current information from the fault detection block 22 as well as an error flag from the motor driver 27 as a basis for controlling the projection control block 23. That is, the projection control block 25 is instructed to turn on and off laser beam projection and to control the beam emission in keeping with a predetermined sequence.

The overall control block 25 also outputs to the fault detection block 22 a mode signal indicative of operation mode. This signal is used by the fault detection block 22 for comparison with the enable signal. Furthermore, the overall control block 25 monitors key components for status in terms of projection conditions such as projection frequency, duty ratio, zoom ratio, and laser power level.

As described, the overall control block 25 not only sends signals to the inventive optical apparatus or laser display apparatus (e.g., projector) but also prompts the components involved to work in smooth collaboration with one another so that the scanning safeguard system will function in a steady and efficient manner. Where necessary, the overall control block 25 monitors the entire system and thus functions as part of a system-wide diagnosis facility.

The scanning safeguard system also acts to inhibit laser beam projection if the overall control block 22 becomes faulty. This is accomplished because the fault detection block 22 is independently on the lookout for fault and prompts the projection control block 23 to act in case of abnormality.

Given an instruction signal from the overall control block 25, the motor driver 27 issues an operation command to the scanner motor 26 for motor operation control. Feedback control is implemented when the motor driver 27 is supplied with information about the actual angle attained by the scanner motor 26, the information coming from the angle sensor 21 attached to the scanner motor 26.

Although not shown, the motor driver 27 has circuits for protecting the scanner motor 26 against failure. These circuits include an overcurrent protection circuit and an overheat protection circuit. If the scanner motor 26 is found faulty, the motor driver 27 sends to the fault detection block 22 a driver error signal indicating the motor failure. The signal causes the optical apparatus or laser display apparatus to halt its operation, illustratively shutting down the laser beam emission.

Information sent from the angle sensor 21 about the angle of the scanner motor 26 is forwarded in analog signal form to the motor driver 27. Alternatively, the information may be sent as a digital signal to the scanner motor 26.

The fault detection block 22 receives information about scanner operation status such as instruction signals, angle information, and drive current information illustratively from the motor driver 27. On the basis of the received information, the fault detection block 22 sends to the overall control block 25 a signal such as a status signal indicating whether the scanner is operating normally or whether the motor is in a deteriorated state. The fault detection block 22 also has the ability to acquire data when the scanner is in normal operation and the ability to compare normal data with the actually acquired data so as to detect any fault that may have developed.

The three major signals input to the fault detection block 22 are described below.

(1) Drive Current Information

Driven generally by electric currents, motors including the scanner motor 26 produce a fault current in the event of a faulty operation. The current for driving the motor increases if a motor component fails and causes greater friction. Detection of the drive current information thus contributes to detecting a failure or fault of the scanner system. Upon detection of a failed state, a signal is sent to the overall control block 25 which in turn issues a stop command or an alert as needed.

(2) Instruction Signal Information

Although not shown, the overall control block 25 has an instruction signal generation circuit and its related components including signal lines. Any one of them may develop faults such as a disconnection or short-circuit. The failure can cause changes in the behavior of some of the other components such as the motor driver 27 in the scanning safeguard system 15. In such a case, it would still be possible to detect the failure using the drive current information, but a faster, more accurate way of fault detection is desired. This is accomplished illustratively by the overall control block 25 inputting an instruction signal directly to the fault detection block 22.

(3) Angle (or Speed) Signal Information

During laser beam projection, the angle and scanning speed of the scanner motor are the most important factors in maintaining a suitably distributed state of laser beam energy. The angle information obtained by the angle sensor 21 or the speed information based on the acquired angle information is thus input to the fault detection block 22.

The fault detection block 22 uses the angle sensor 21 to sense the rotation angle of the mirror in order to verify whether the scanner is operating normally. That means the scanner is being monitored for failure. The detection of any fault in the scanner is accomplished illustratively by resorting to one or both of the following two methods:

(1) Detection of speed-related faults, such as signal disconnection, power outage, mechanical failure, or acquisition of error signal.

(2) Detection of cycle- and/or amplitude-related faults, such as acquisition of error signal, servo circuit error, etc.

The detection of speed-related faults will now be described.

[Detection of Speed-Related Faults]

Figure 6A:
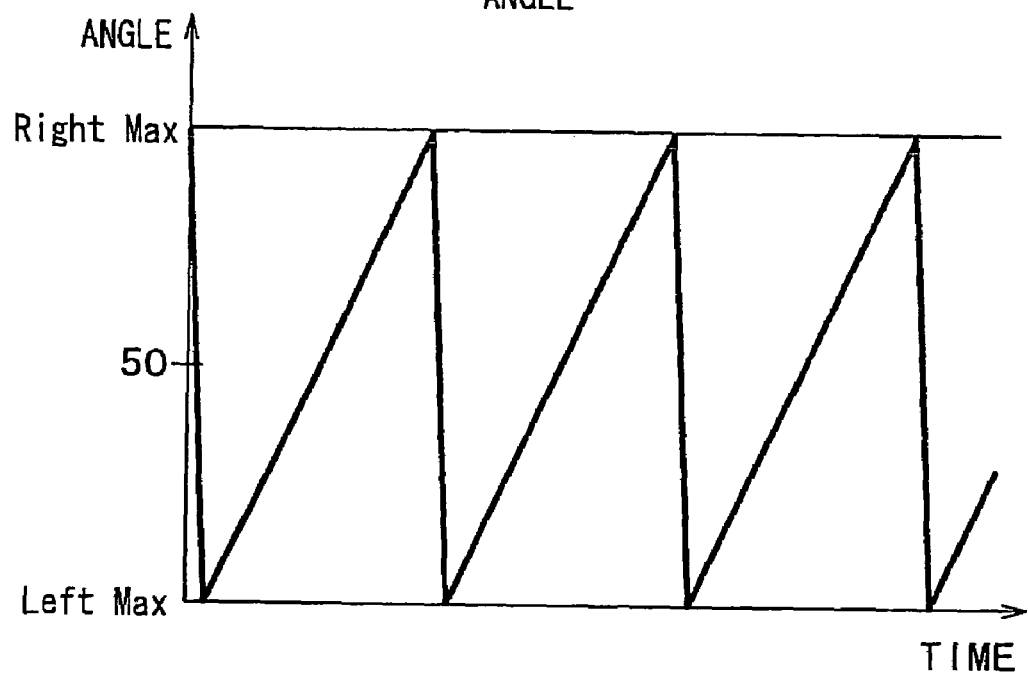
FIGS. 6A and 6B are waveform charts representative of mirror rotation angles and mirror rotational speeds in effect during normal scanner operation.
Figure 6B:
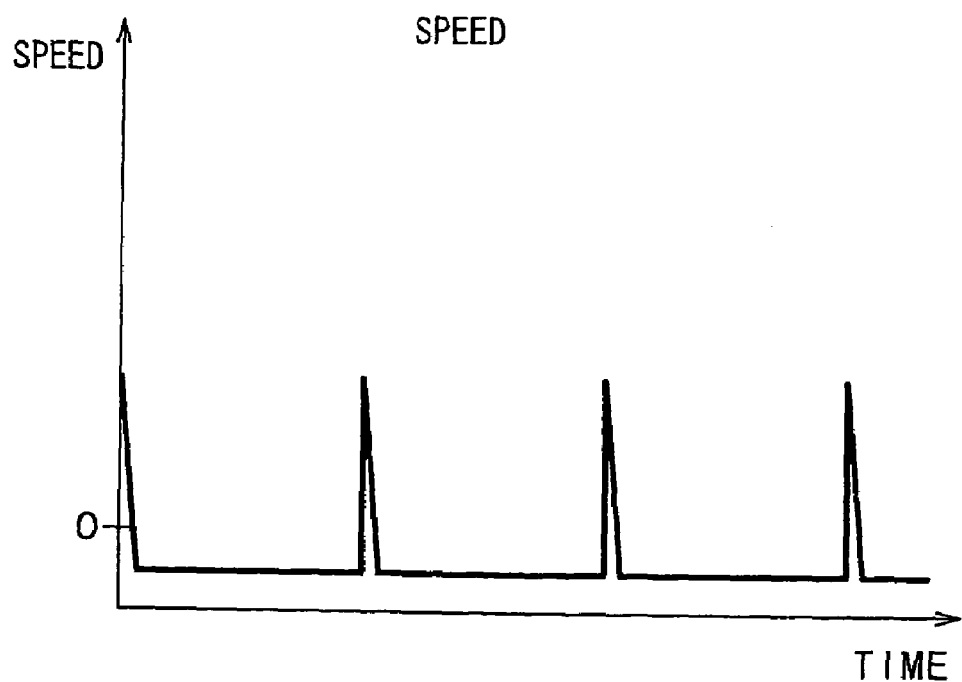

FIG. 6A shows a waveform representing angles of reciprocal rotation of the scanning mirror in the normally functioning scanner. FIG. 6B depicts a speed waveform obtained by differentiating the angles shown in FIG. 6A. During normal operation, a low-speed state in which the laser beam is emitted and a high-speed state in which projection starting status is restored are reciprocated.

Figure 7:
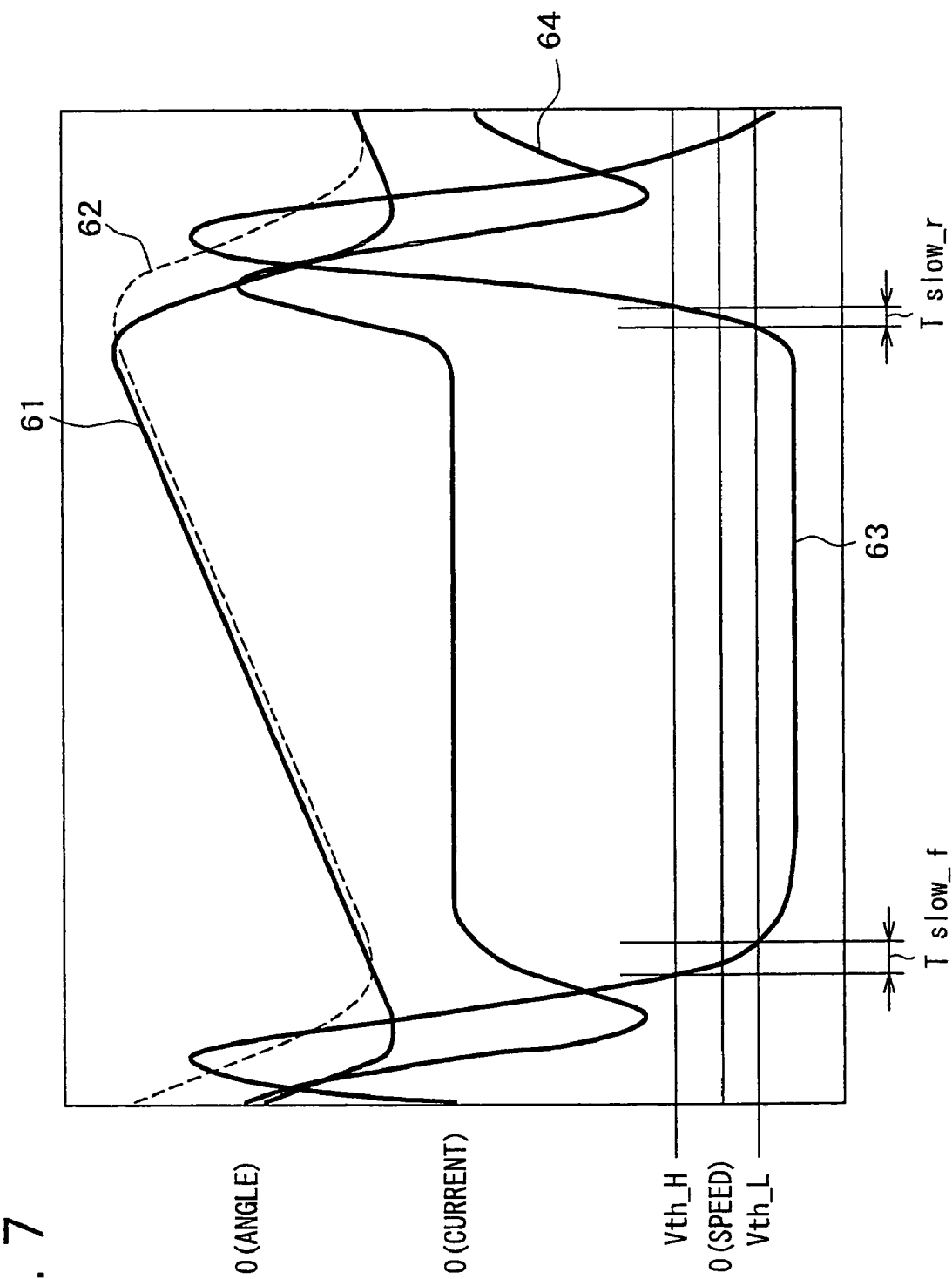
FIG. 7 is a graphic representation of an instruction signal waveform sent to a motor driver, a rotational angle detection signal waveform derived from a mirror, a supply current waveform from a motor, and a mirror speed waveform from the mirror, all waveforms being used for detecting a scanner speed fault.

FIG. 7 shows four waveforms in effect during normal operation with time denoted by the horizontal axis. The waveforms comprise: a waveform (curve 61) representing the instruction signal sent to the motor driver 27 of the scanner motor 26; a waveform (curve 62) representing mirror angle information derived from the mirror being rotated according to the instruction signal; a waveform (curve 63) representing differential values derived from the angle information waveform 62 (i.e., waveform of mirror rotation speed); and a waveform (curve 64) representing currents supplied to the scanner motor 26.

In transitional states of decelerating to and accelerating from a steady speed, as plotted by the curve 63, there are two time periods Tslow_f and Tslow_r, each having a specific reference level (e.g., speed zero) interposed between two speed values Vth_L and Vth_H. Each of the time periods Tslow_f and Tslow_r remains constant as long as the rotating mirror is normally reciprocating, the periods being repeated at fixed intervals.

A scanner failure will change the speed pattern. The failure leads to changes in the time periods Tslow_f and Tslow_r or in their timing of appearance. Sensing such changes makes it possible to detect a scanner system fault. Illustratively, if the scanner motor breaks down and stops, the speed drops to zero. In that case, the time periods Tslow_f and Tslow_r are inordinately prolonged, or they appear in an abnormally timed manner. Detection of these changes allows the scanner failure to be recognized.

Figure 8A:
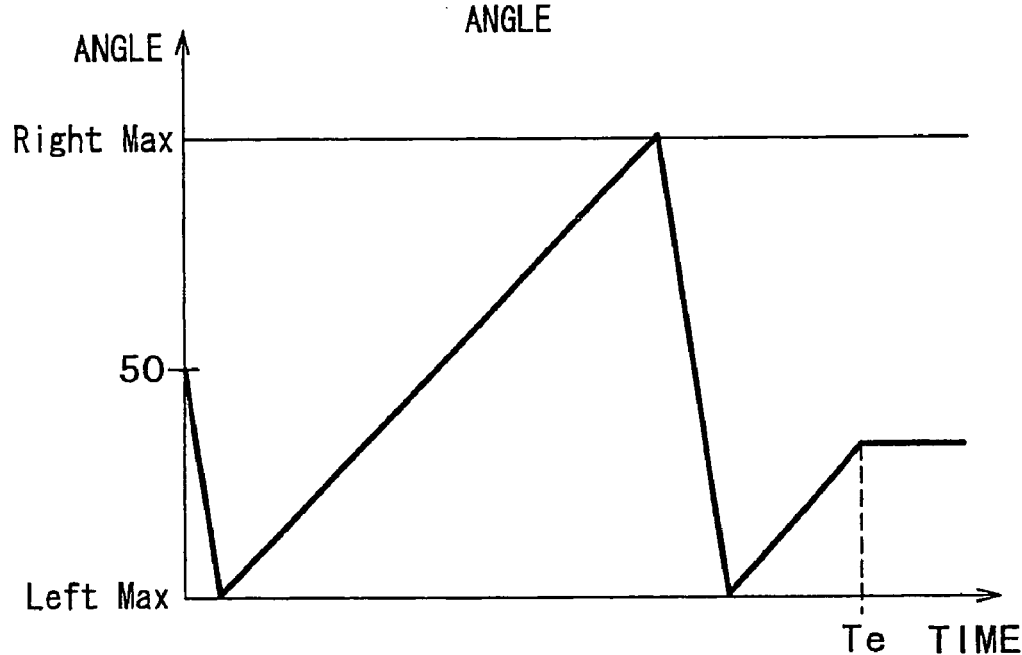
FIGS. 8A and 8B are waveform charts comparing the normal state of the mirror with its stopped state in terms of mirror angles and mirror speeds.
Figure 8B:
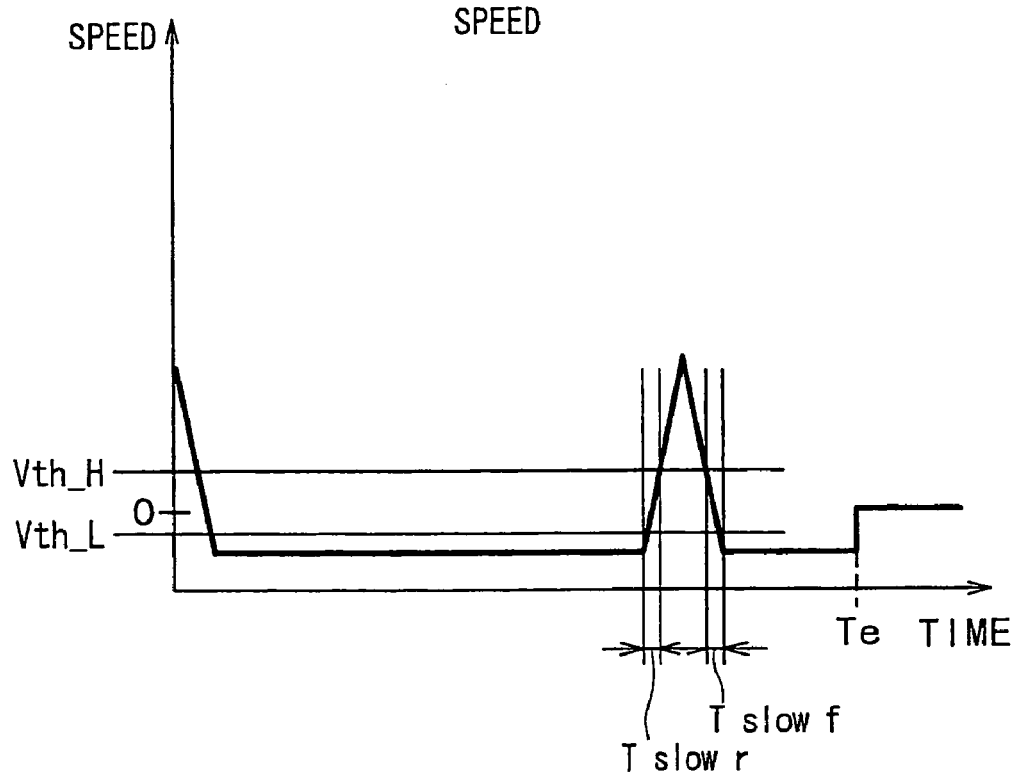

FIGS. 8A and 8B graphically depict relations between angles and speeds in case of a failure. In this example, the point of fault occurrence is represented by Te. Before Te, regular angle changes are seen taking place. After Te, no changes are observed in angle or speed. That can only mean that the scanner is stopped.

The foregoing was a description of how the failure indicative of a stopped scanner is detected by a speed detection setup based on the angles sensed by the angle sensor. In addition to the failure attributable to the scanner stoppage, a fault caused by deviations from the tolerable speed range can also be detected by the laser display apparatus according to this invention.

In the latter case, a check is made to determine whether the mirror driving mechanism is operating normally on the basis of a plurality of factors: the speed values Vth_L and Vth_H, the time periods Tslow_f and Tslow_r, and speed changing cycles derived from these factors. More specifically, the two speed values Vth_L and Vth_H are first detected and compared with predetermined settings. The results of the comparison are used to find the time periods Tslow_f and Tslow_r. In turn, these values are used to determine speed changing cycles. The obtained cycles are compared with predetermined settings. The results of the comparisons are finalized through AND operations.

Figure 9:
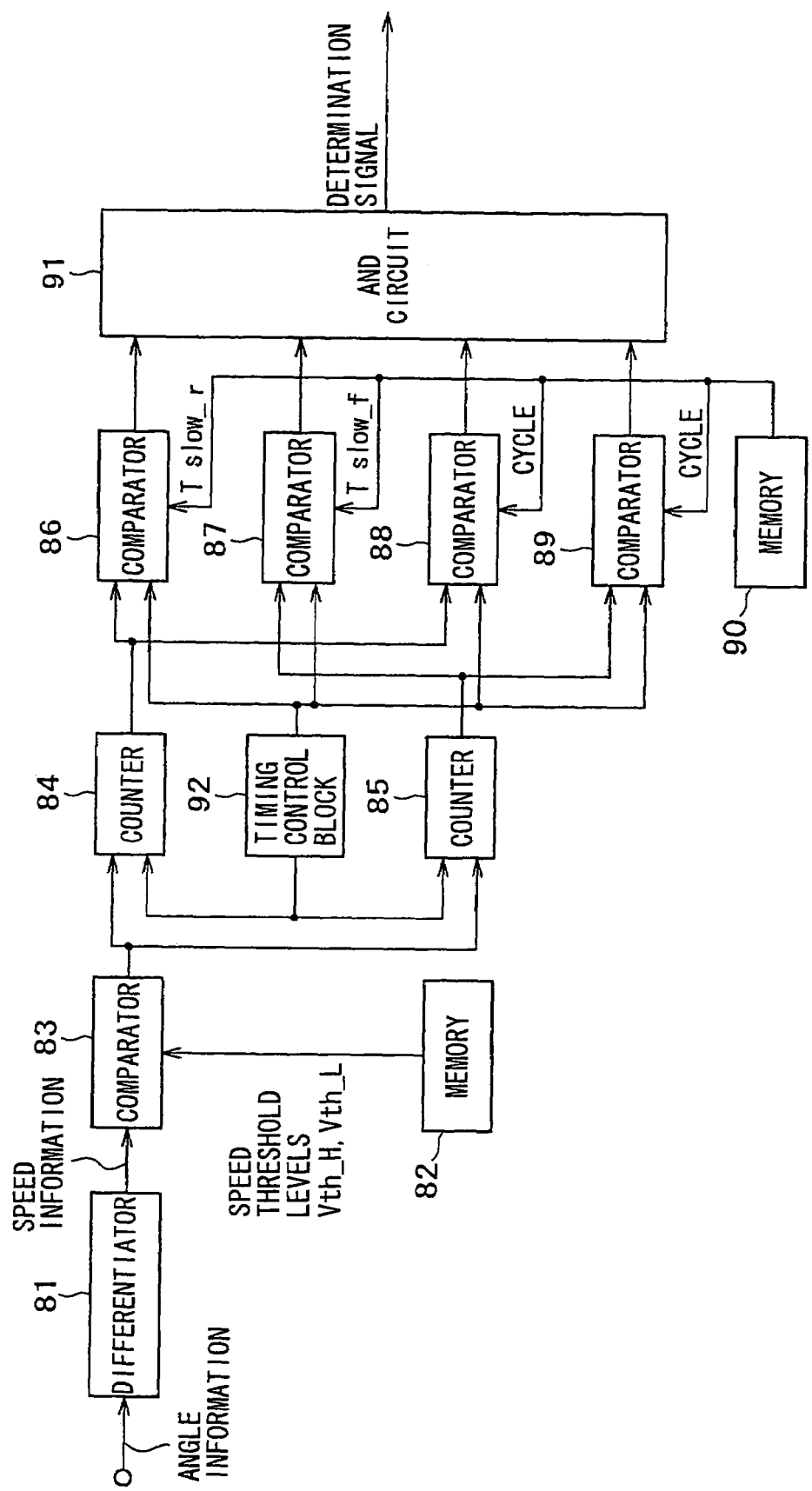
FIG. 9 is a schematic block diagram of a fault detection block for detecting a mirror speed fault.

FIG. 9 is a schematic block diagram of a typical fault detection block according to the invention. The fault detection block of this example includes: a differentiator 81 that translates angle information into speed information; a memory 82 that holds the speed threshold values Vth_L and Vth_H; and a comparator 83 for comparing the speed threshold values Vth_L and Vth_H retrieved from the memory 82 with the speed information coming from the differentiator 81.

The fault detection block further includes: a memory 90 that retains the time periods Tslow_f and Tslow_r, and decelerating and accelerating period values; counters 84 and 85 for keeping count; comparators 86 through 89 for comparing the results of the counting with the time periods Tslow_f and Tslow_r and the cycle values retrieved from the memory 90; and an AND circuit 91 which, by AND'ing the input results, determines whether the scanner is normal (represented by a 1) or faulty (represented by a 0). In this example, reference numeral 92 denotes a timing control block for controlling the drive timings of the counters 84 and 85 and of the comparators 86 through 89.

The detection of cycle- and amplitude-related faults will now be described.

[Detection of Cycle/Amplitude-Related Faults]

FIG. 10A shows a waveform representing angle information output by the scanning mirror. Levels Hth1 and Lth2 denote two over-scanning levels, one being a higher-than-normal level, the other being a lower-than-normal level. Levels Hth2 and Hth1 are normal scanning levels that are crossed during normal operation and are for use in detecting a cycle fault or an under-scanning fault.

That is, the levels Hth1 and Lth2 are not crossed during normal operation. If the two levels are found crossed, then an amplitude fault (over-scanning) is recognized. Whether or not the scanning cycle is normal is determined by monitoring the timings of the levels Hth2 and Lth1 getting crossed. If these two levels are not crossed, both a cycle fault and an amplitude fault (under-scanning) are recognized.

FIG. 10B shows a signal waveform representing the levels Hth1, Hth2, Lth1 and Lth2 in effect when the angle information output is normal. That is, FIG. 10B illustrates status in which the angle information output does not exceed the levels Hth1 and Lth2, i.e., where the detected output is zero. Waveforms 93 and 94 are output waveforms obtained when the angle information output crosses the levels Hth2 and Lth1. In FIG. 10B, upward and downward arrows indicate where the scanning cycle is detected. The upward arrows indicate points at which the cycle is detected while the mirror is scanning with the laser beam, and the downward arrows represent points at which the cycle is detected while no effective scanning is being made (i.e., return period).

Figure 11:
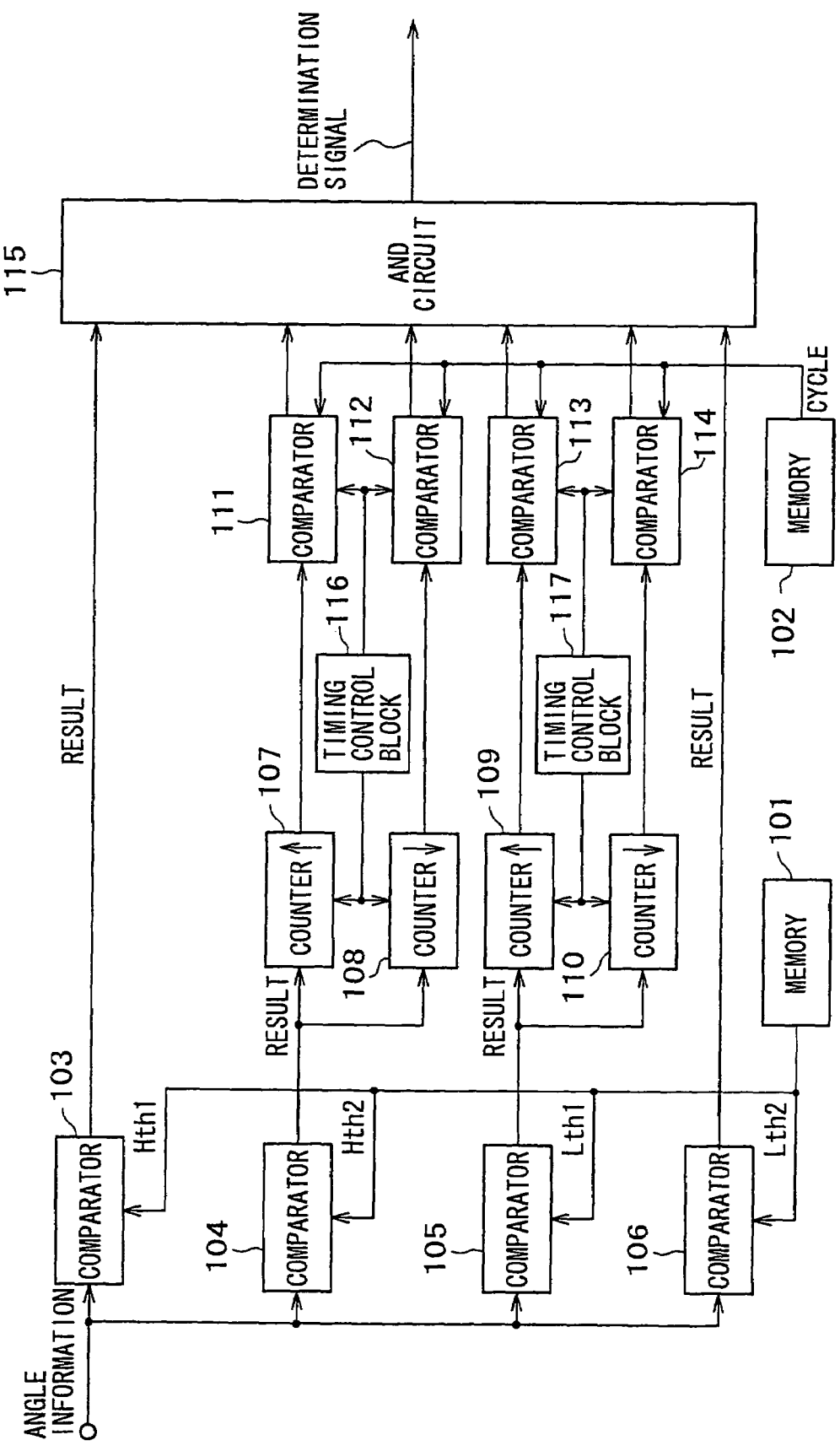
FIG. 11 is a schematic block diagram of a fault detection block for detecting a cycle fault and an amplitude fault.

FIG. 11 is a schematic block diagram of the fault detection block for detecting cycle- and amplitude-related faults. As illustrated, the fault detection block includes: a memory 101 that holds reference data applicable to normal operation, and threshold values such as the levels Hth1, Hth2, Lth1 and Lth2; a memory 102 that retains normal operation cycles; comparators 103, 104, 105 and 106 for comparing the angle information measured by the angle sensor with the levels Hth1, Hth2, Lth1 and Lth2 supplied from the memory 101; counters 107 and 108 for counting the results of comparison from the comparator 104; counters 109 and 110 for counting the results of comparison from the comparator 105; comparators 111, 112, 113 and 114 for comparing the results of counting from the counters 107 through 110 with cycle signals retrieved from the memory 102; and an AND circuit 115 which, by AND'ing the input results, determines whether there exists any fault. The fault detection block further comprises a timing control block 116 that synchronizes the counters 107 and 108 and the comparators 111 and 112, and a timing control block 117 for synchronizing the counters 109 and 110 as well as the comparators 113 and 114.

The comparators 103 and 106 compare the angle information with the reference data and threshold signals (i.e., level signals Hth1 and Lth2) acquired from the memory 101. In this case, the comparators 103 and 106 act to detect an exceeded level only if the angle information is input, i.e., if a signal crossing the level Hth1 or Lth2 is introduced. The result of the comparison is forwarded to the AND circuit 115.

The comparators 104 and 105 compare the angle information with the level signals Hth2 and Lth1 from the memory 101. The results of the comparisons are fed to the counters 107, 108, 109 and 110. The counters 107 and 109 count scanning cycle detection signals on the curves 93 and 94 (points of detection indicated by upward arrows) in FIG. 10B, while the counters 108 and 110 count cycle detection signals on the curves 93 and 94 (indicated by downward arrows). The timing control blocks 116 and 117 make a changeover between the counters 107 and 108 on the one hand and the counters 109 and 110 on the other hand.

The output from the counters 107 through 110 is supplied to the comparators 111 through 114 respectively. These comparators compare what is received with the cycle signals from the memory 102. From each of the comparators 111 through 114, the AND circuit 115 receives a signal indicating whether the scanning is sensed as normal. In this case, too, the timing control blocks 116 and 117 make a changeover between the comparators 111 and 112 on the one hand and the comparators 113 and 114 on the other hand, while synchronizing the counters 107 through 110 and the comparators 111 through 114. The AND circuit 115 ultimately determines whether the scanner is functioning normally.

Figure 12A:
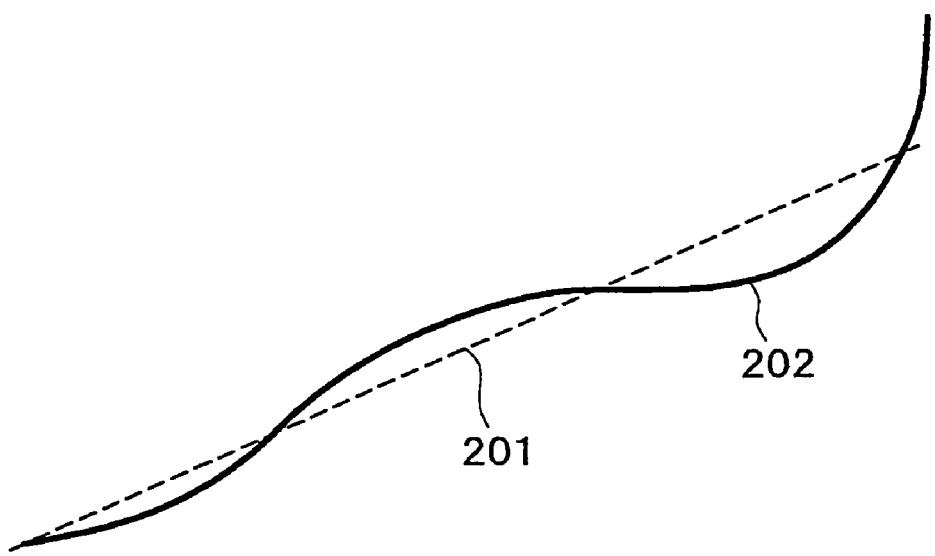
FIGS. 12A and 12B are schematic explanatory views illustrating how a comparison block compares reference data and threshold levels obtained from a memory with angle information, i.e., measured data.
Figure 12B:
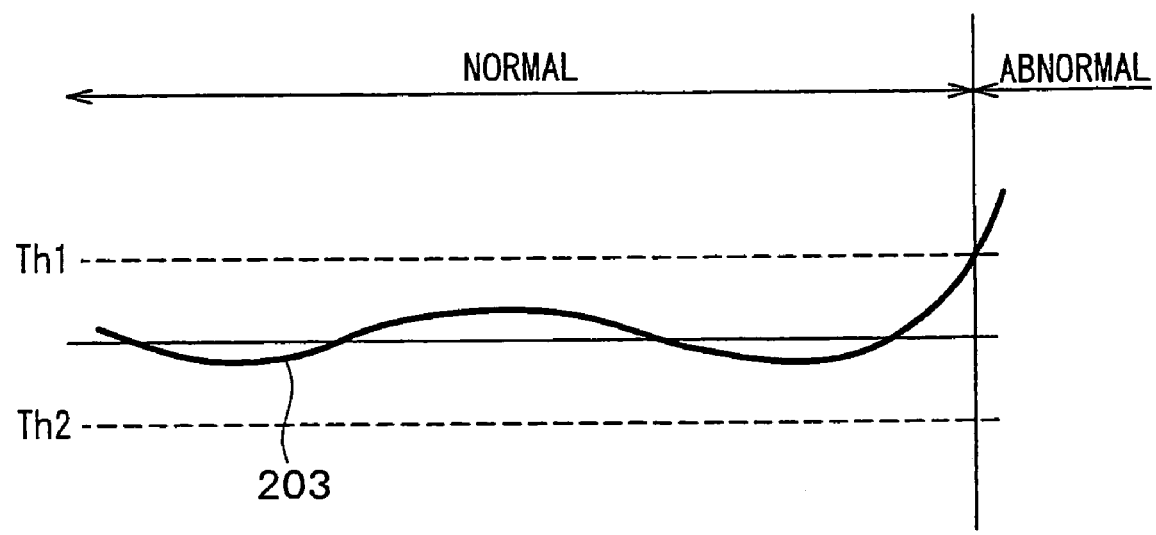

Described below with reference to FIGS. 12A, 12B, 13A and 13B is a typical setup for comparing the reference data and threshold values retrieved from memory with angle information, i.e., actually measured data. In this example, differences are acquired between the reference data from memory (indicated by straight line 201) and the measured data (curve 202) as shown in FIG. 12A. The differences thus obtained constitute difference data represented by a curve 203 in FIG. 12B. The difference data are compared with threshold values such as Th1 and Th2. The result of the comparison is examined so as to determine whether the scanner motor functions normally.

Figure 13A:
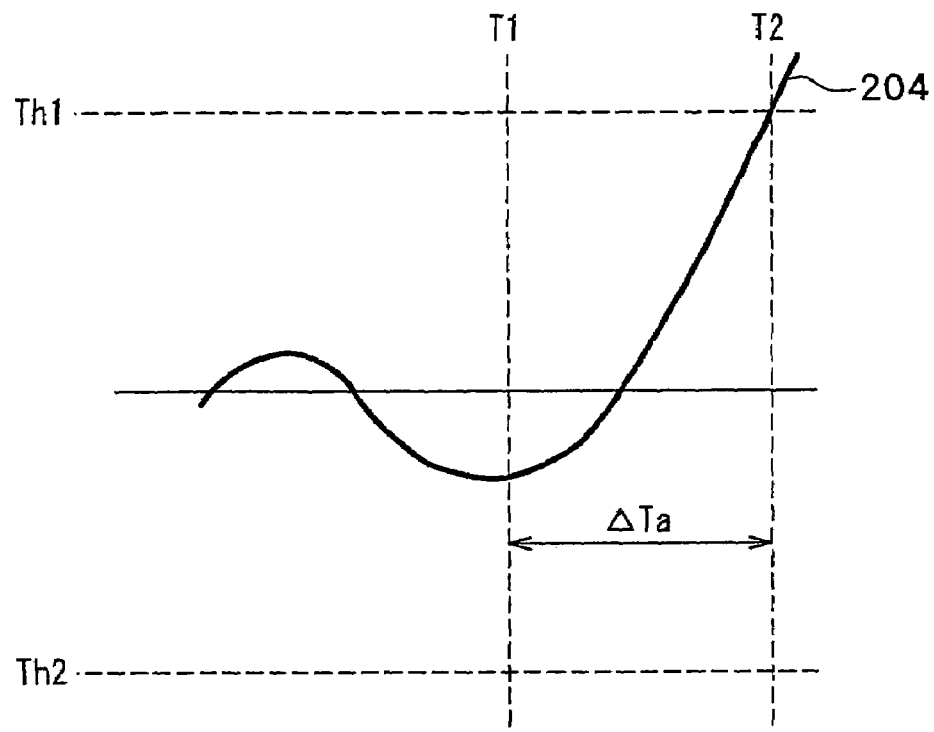
FIGS. 13A and 13B are schematic explanatory views showing how the comparison block compares reference data and threshold levels obtained from a memory with angle information, i.e., measured data, in terms of threshold level settings and fault detection timings.
Figure 13B:
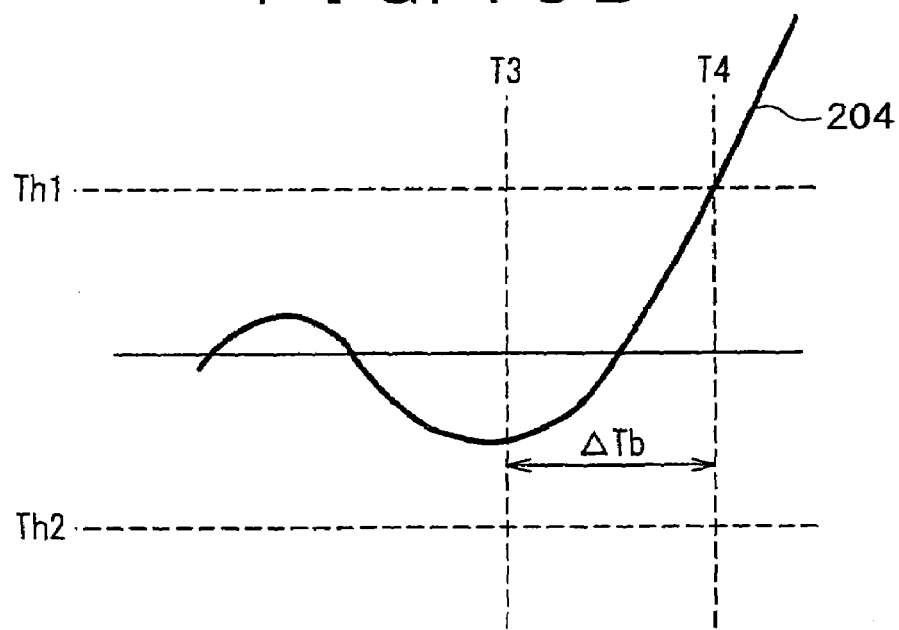

In the comparing setup above, a time period $\Delta T$ elapses from the time a fault occurs until the fault is detected. If the threshold values Th1 and Th2 are made appreciably large in the positive and the negative directions respectively, as shown in FIG. 13A, then a fault detection time period $\Delta Ta$, i.e., the difference in time between a time T1 at which a fault occurs and a time T2 at which the fault is detected, is correspondingly prolonged. On the other hand, if the threshold values Th1 and Th2 are made smaller in the positive and the negative directions respectively, as depicted in FIG. 13B, then a fault detection time period $\Delta Tb$, i.e., the difference in time between a time T3 at which a fault occurs and a time T4 at which the fault is detected is shortened accordingly.

Where the fault detection time period $\Delta T$ is made inordinately short, the comparing setup tends to detect even small deviations in the difference data as faults. This can be a source of annoying stoppages. The fault detection time period $\Delta T$ should thus be long enough to keep the inventive optical apparatus and laser display apparatus from getting disabled needlessly and small enough to afford an appropriately short detection span. As long as these requirements are met, desired threshold values are allowed to be set on the optical apparatus and laser display apparatus of this invention in keeping with their specific purposes.

The foregoing was a description of the angle information comparing setup according to the invention. Similar comparing setups are utilized by the fault detection blocks of the inventive optical apparatus for comparison with other types of information.

Figure 14:
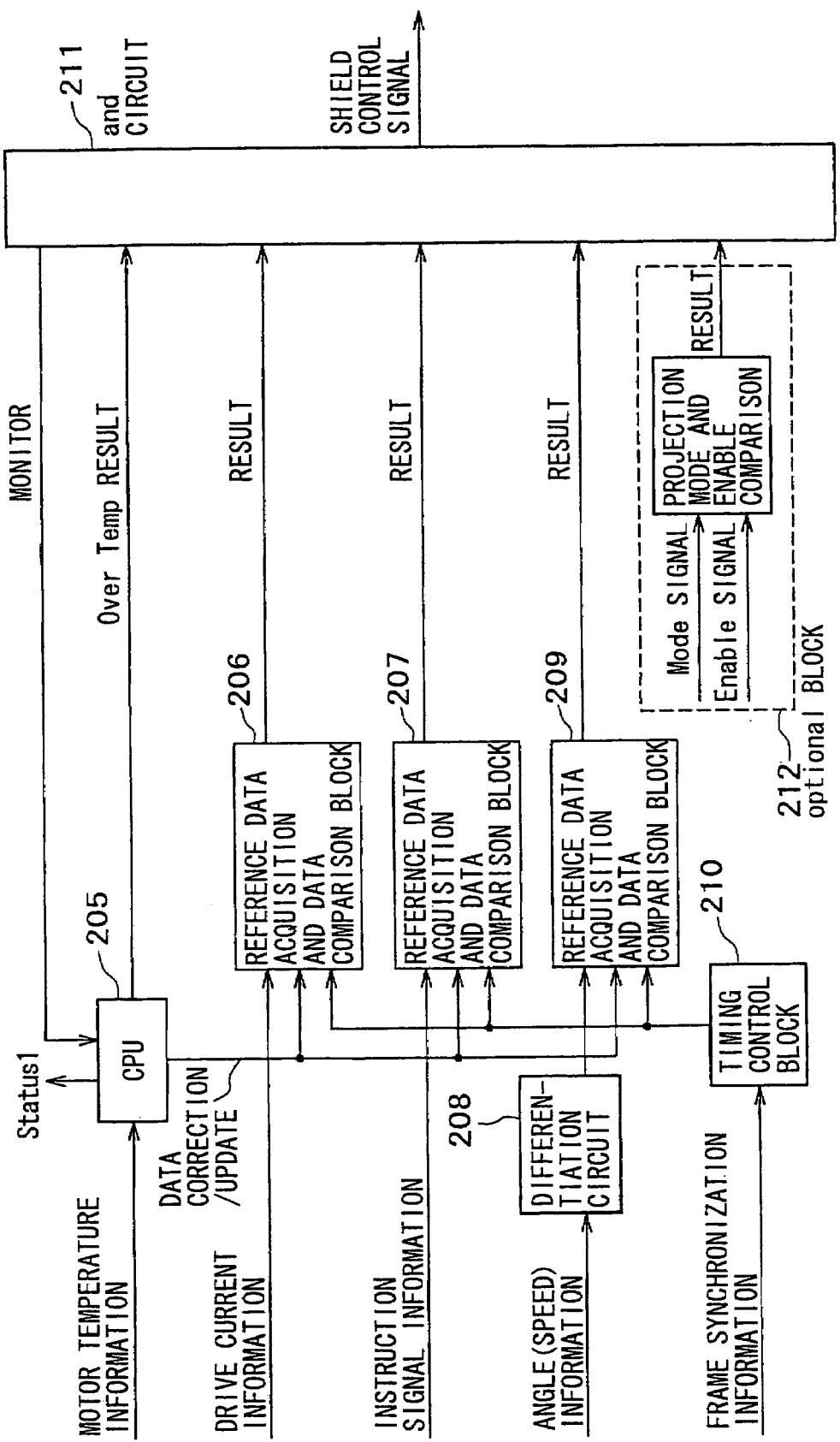
FIG. 14 is a schematic block diagram outlining how each fault detection block acquires reference data and threshold levels and how comparison blocks compare the acquired data with measured data.
Figure 15:
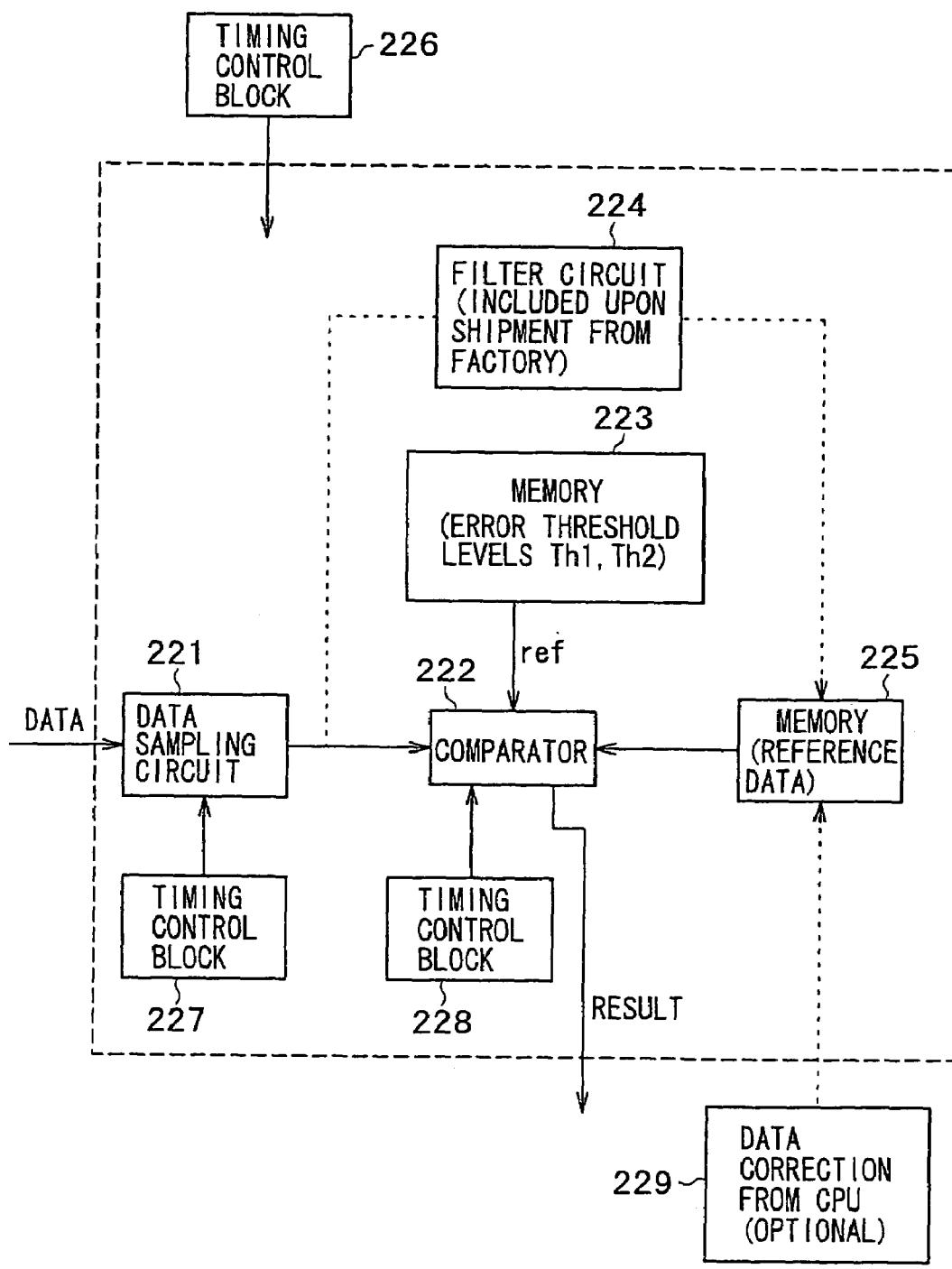
FIG. 15 is a schematic block diagram showing how each fault detection block acquires reference data and threshold levels in a first embodiment of the invention.
Figure 16:
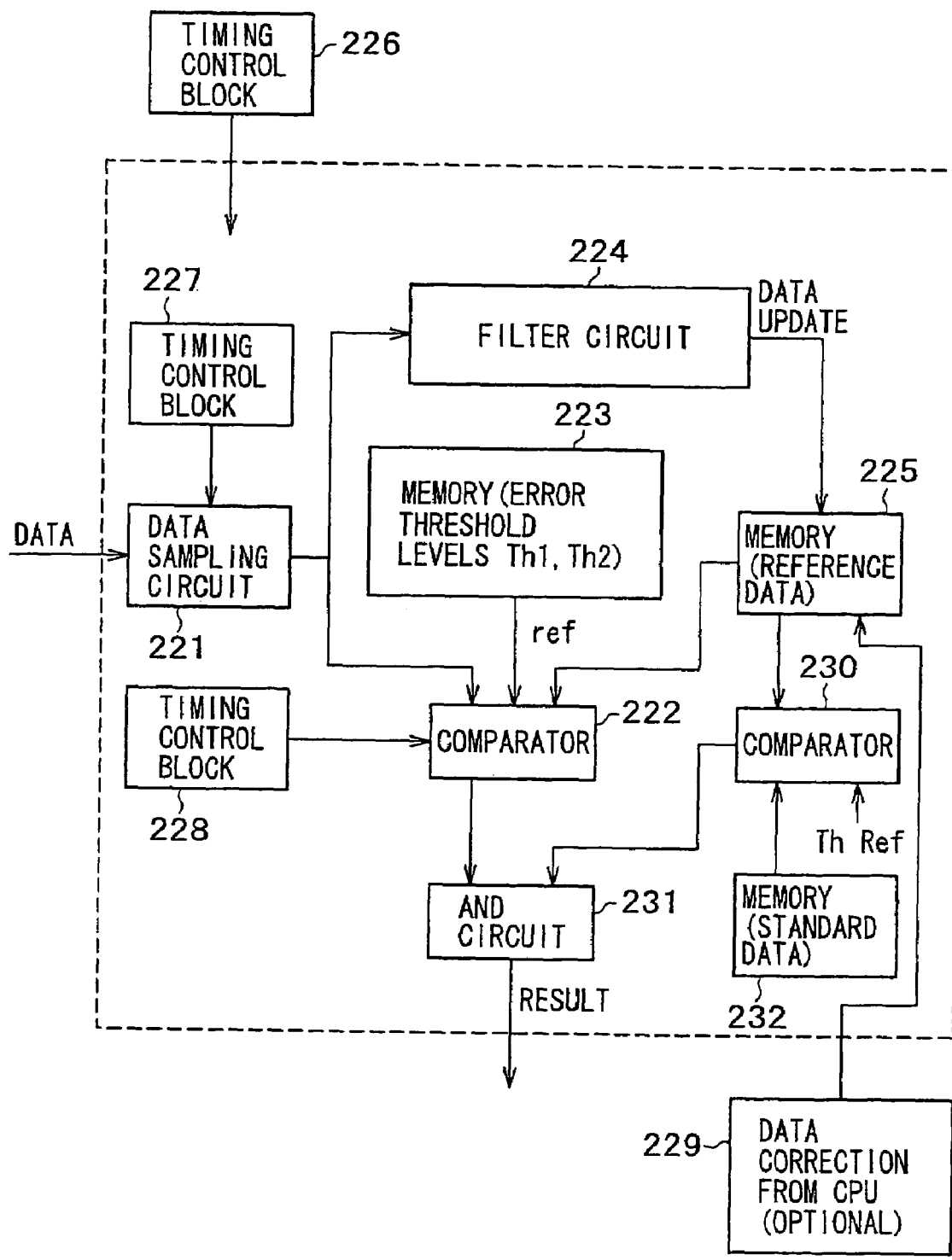
FIG. 16 is a schematic block diagram showing how each fault detection block acquires reference data and threshold levels in a second embodiment of the invention.

Described below with reference to FIGS. 14, 15 and 16 is how the fault detection block typically acquires reference data and threshold values. In the optical apparatus and laser display apparatus according to the invention, each fault detection block acquires reference data and threshold values, and each comparison block compares the acquired data with measured data. How these blocks work will now be described with reference to FIG. 14.

The comparing setup of FIG. 14 comprises: a data correction block 205 made up of a CPU (central processing unit); a reference data acquisition and data comparison block 206 for acquiring the reference data about drive currents and comparing the acquired reference data with measured data; a reference data acquisition and data comparison block 207 for acquiring the reference data about instruction signals and comparing the acquired reference data with measured data; a differentiation circuit 208 that translates angle information into speed information; a reference data acquisition and data comparison block 209 for acquiring the reference data about the speed information coming from the circuit 208 and comparing the acquired reference data with measured data; a timing control block 210 for controlling the blocks in accordance with a frame synchronizing signal; an AND circuit 211 which receives temperature information from the CPU and AND's the input for feedback control purposes; and an optional block 212 that compares a projection mode signal with an enable signal. The AND circuit 211 outputs a shield control signal based on the AND operation of the input from the blocks 206, 207 and 209 as well as the input from the optional block 212 if necessary.

Described below with reference to FIG. 15 is a first example in which the fault detection block acquires reference data and threshold values. The first example applies illustratively upon shipment of the inventive apparatus from the factory following manufacture. This example comprises a data sampling circuit 221, a comparator 222, a memory 223, a filter circuit 224, a memory 225, timing control blocks 226, 227 and 228; and a data correction block 229 typically formed by a CPU.

Upon shipment from the factory, the data sampling circuit 221 under control of the timing control block 227 forwards reference data to the memory 225 through the filter circuit 224 for noise removal. The reference data thus forwarded are placed into the memory 225.

When the apparatus is first used following shipment from the factory, the comparator 222 compares measured data from the data sampling circuit 221 with the reference data placed in the memory 225 as well as with, say, threshold value data Th1 and Th2 in the memory 223. Upon comparison, the detection block as a whole is controlled by the timing control block 226. The data sampling circuit 221 is controlled by the timing control block 227 and the comparator 222 by the timing control block 228. In this case, the reference data held in memory may be corrected for temperature by the data correction block 229 typically made of a CPU.

Described below with reference to FIG. 16 is a second example in which the fault detection block acquires reference data and threshold values. The second example applies illustratively where the user who purchased the inventive apparatus updates reference data as needed, or installs a memory that contains standard data serving as standards with respect to reference data, and a comparator for comparing the reference data with the standard data in the memory.

Of the reference numerals in FIG. 16, those already used in FIG. 15 designate like or corresponding parts, and their descriptions are omitted where redundant. Specifically, the components 221 through 229 shown in FIG. 15 are supplemented in FIG. 16 by the following parts: a memory 232 holding standard data serving as standards with regard to the reference data in the memory 225; a comparator 230 for comparing the reference data in the memory 225 with the standard data in the memory 232; and an AND circuit 231 that AND's the result from the comparator 222 with the result from the comparator 230.

Upon shipment from the factory, the data sampling circuit 221 under control of the timing control block 227 forwards the reference data to the memory 225 through a filter for noise removal. The forwarded reference data are placed into the memory 225.

When the apparatus is first used following shipment from the factory, the comparator 222 compares the measured data from the data sampling circuit 221 with the previously stored reference data in the memory 225 as well as with, say, the threshold value data Th1 and Th2 placed separately in the memory 223. In this case, the detection block as a whole is controlled by the timing control block 226. The data sampling circuit 221 is controlled by the timing control block 227 and the comparator 222 by the timing control block 228.

Later, the user who purchased the apparatus may have the data in the memory 225 updated by way of the filter circuit 224 as needed. If the reference data in the memory 225 are updated by the comparator 230 using the standard data in the memory 232, the comparison by the comparator 230 of the standard data in the memory 232 with the reference data subsequent to the comparison involving the data sampling circuit 221 still allows the AND circuit 231 to provide overall relevant results. In this case, too, the reference data held in memory may be corrected for temperature by the data correction block 229 typically made of a CPU.

Figure 17:
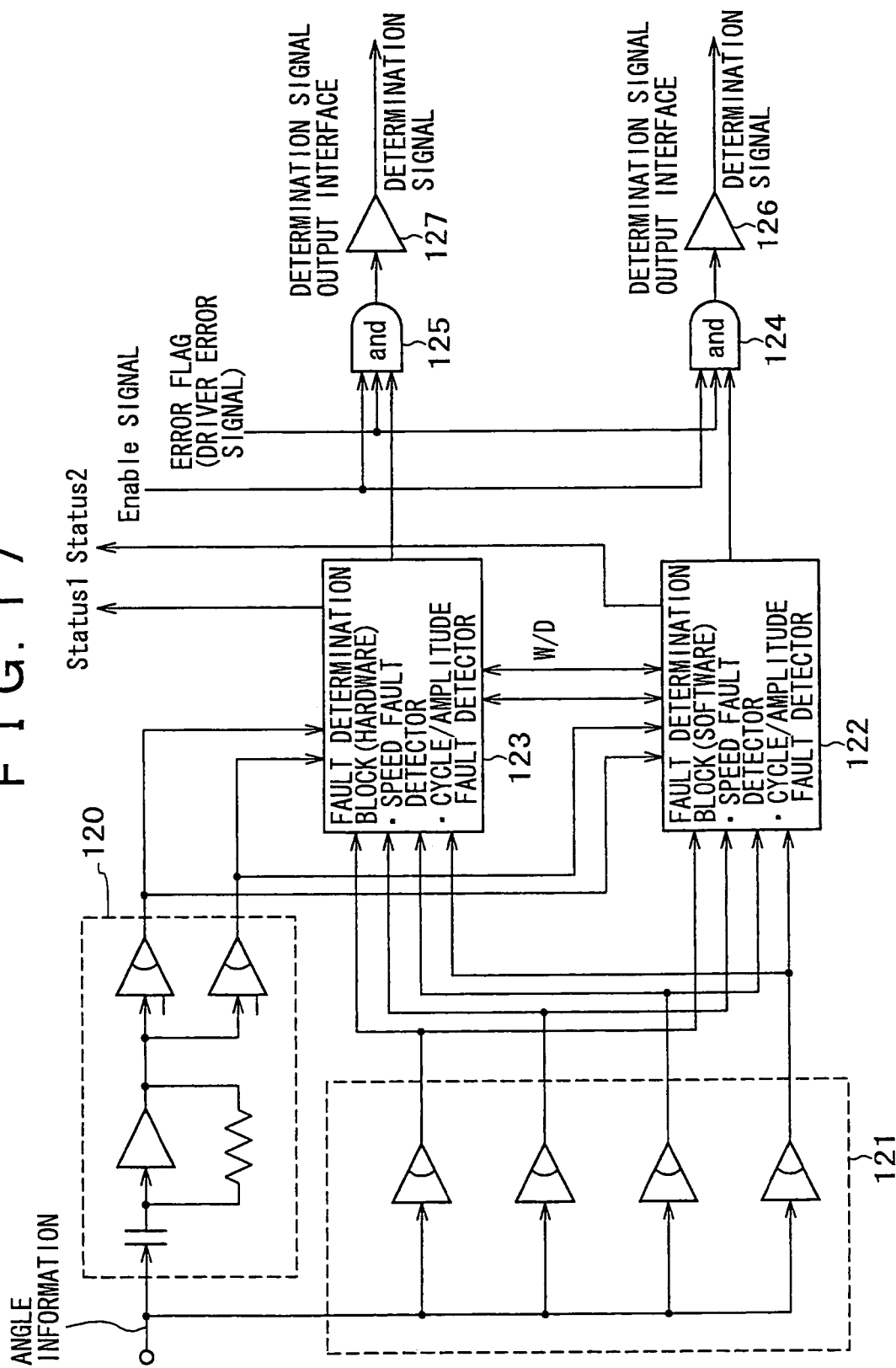
FIG. 17 is a schematic block diagram of a determination signal acquisition block which acquires a determination signal based on the output from fault detection blocks detecting faults by sensing speeds, cycles and amplitudes.

FIG. 17 is a schematic block diagram of a determination signal acquisition block which acquires a determination signal based on the output from the fault detection blocks detecting faults by sensing speeds, cycles and amplitudes as discussed above with reference to FIGS. 9 and 11. This is an example in which a first and a second fault determination block are used to make doubly sure that the ultimate determination is reliable.

AND circuits are included to make sure that the laser beam projection is permitted only if the results from all fault detection blocks are normal. If any one of the fault detection blocks gives a result indicative of a fault, the AND circuits function to terminate the laser beam projection.

In FIG. 17, reference numeral 120 denotes a speed fault detection block made up of comparison circuits admitting the angle information from the speed fault detection block shown in FIG. 9. Reference numeral 121 represents a cycle/amplitude fault detection block formed by comparison circuits admitting the angle information from the cycle/amplitude fault detection block depicted in FIG. 11. Determination signals output by the blocks 120 and 121 are input to the first fault determination block 122 and the second fault determination block 123. The fault determination block 122 is illustratively composed of a CPU running software, and the second fault determination block 123 is formed by hardware. This dual determination scheme constitutes a fail-safe system. That is, the two blocks can handle events in terms of both hardware and software.

In this example, an output circuit arrangement has AND circuits 124 and 125 as well as amplifier circuits 126 and 127. This arrangement AND's a driver error signal, a scanner driver instruction signal (i.e., enable signal), and a scanner driver internal error determination signal (i.e., error flag). The result of the AND operation is output as a determination signal (a "1" for projection enabled; a "0" for projection disabled).

Where the determination signal is suitably employed, the laser beam projection is stopped in case of a scanner motor driver fault. This arrangement, too, is a dual circuit setup that constitutes a fail-safe system. The first and the second fault determination blocks output a status signal each, allowing the overall control block 25 of FIG. 4 to grasp the current status of the apparatus.

In addition to the above-described method, various alternative fault detection methods may be conceived and practiced. One such method involves having data such as angles and speeds sampled continuously for comparison with reference data so that if the difference between the sampled data and the reference data exceeds a predetermined threshold level, a fault is recognized. Another alternative method involves having the drive current monitored for comparison with reference data or for the determination of an overvoltage. Where the angle information and a reference signal are sampled and compared continuously, the fault detection time period is obtained by the formula (1/sampling cycle+α). This method thus ensures high-speed fault detection.

Where the above-described structure of the invention is in use, a laser scanner fault triggers a shutdown or a stoppage of the laser beam projection directed outward. This prevents an excessively powerful laser beam from being emitted externally or getting directed at spots outside the regulated area, so that possible harmful effects on human bodies are averted.

The above-described structure is designed primarily to deal with faults that may occur inside the laser scanner during operation. In order to ensure higher levels of safety, it is preferable to implement a structure equipped with a diagnosis function for examining characteristics of the laser scanner so that prior to its operation, the laser scanner may be checked for potential fault.

What follows is a description of the diagnosis function that is implemented typically to operate on the basis of a constant voltage, frequency modulation, or amplitude modulation.

The diagnosis function operates first of all based on a constant voltage as follows: a constant angle instruction signal is given to the scanner system. The angle indicated by the signal is compared with actually measured angle information to see if the scanner and the angle sensor are operating normally. In this case, the fault detection block 22 and projection control block 23 in FIG. 4 may be monitored by the overall control block 25 using the instruction signal so as to verify the operation status of the components involved.

The diagnosis function also operates based on frequency modulation as follows: the frequency for operating the scanner is varied between suitably low and high levels encompassing the normal frequency range. During the frequency variation, the components involved are monitored for operation status so as to determine whether fault detection is normally carried out.

The diagnosis function further operates based on amplitude modulation as follows: the amplitude of the instruction signal is varied between suitably small and large amplitude ranges encompassing the normal amplitude. During the amplitude variation, the components involved are monitored for operation status so as to determine whether fault detection is normally performed.

In the manner described, the components are examined for their operation status by the diagnosis function.

Figure 18:
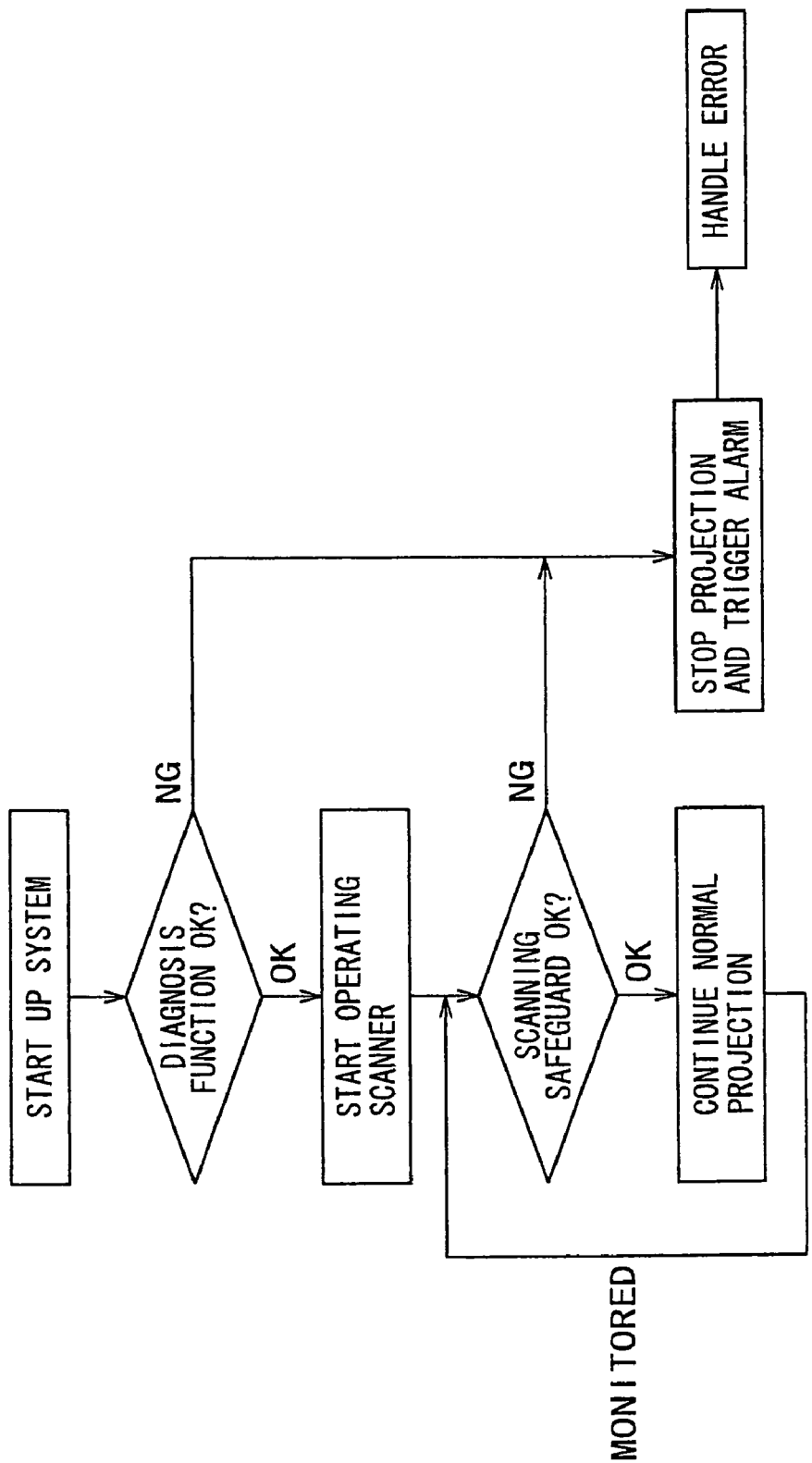
FIG. 18 is a flowchart of steps executed by a scanning safeguard system according to the invention.

The scanning safeguard system is implemented using the inventive setups described above. The projector system as a whole is controlled by the flow of steps described below with reference to FIG. 18.

The system is first started up. The activated system is self-tested, i.e., examined by the diagnosis function. If the diagnosis detects something irregular, the laser beam projection is stopped, an alarm is triggered if necessary, and an error handling routine is carried out. If the diagnosis detects nothing irregular, the scanner is allowed to start operating. The operating scanner is checked by the scanning safeguard system for anything faulty. If a fault is detected, the laser beam projection is stopped, an alarm is triggered as needed, and the error handling routine is executed. If nothing irregular is detected by the scanning safeguard system, the laser beam projection is allowed to continue normally. During operation, the scanner is being monitored and the measured data are being sent back to the scanning safeguard system for feedback control.

As described, the optical apparatus and laser display apparatus according to the invention have the scanning safeguard system comprising a plurality of fault detection blocks. In case of a fault such as a laser scanner failure, the fault is detected and the laser beam projection is halted accordingly. This scheme forestalls a locally immobilized laser projection resulting in a substantially excessive dose of laser beam emission per unit area, thus ensuring that the safety standards for laser beam emission are always complied with.

Furthermore, the inventive optical apparatus and laser display apparatus accelerate the speed of fault detection by reducing the fault detection time period ΔT as discussed in conjunction with FIG. 13. Because this invention proposes techniques of fault detection based primarily on the detection of laser scanner angles, the invention applies not only to polygon mirrors but also to galvanometer mirror scanners that are checked for failure reliably by the scanning safeguard system.

The invention thus provides higher levels of safety and other related benefits for display apparatuses such as laser beam projectors. In particular, the projector can be operated to project images onto a large screen at high levels of luminous intensity with enhanced safety.

As many apparently different embodiments of this invention may be made without departing from the spirit and scope thereof, it is to be understood that the invention is not limited to the specific embodiments thereof except as defined in the appended claims.

What is claimed is:

1. A laser display apparatus having a scanner for scanning a predetermined area with a laser beam, said laser display apparatus comprising:

a laser source;

a light modulator for modulating a laser beam generated by said laser source;

the scanner having a scanning mirror for causing the laser beam modulated by said light modulator to scan;

an angle sensor for sensing angles of said scanning mirror of said scanner;

a fault detection block for determining whether said scanning mirror operates safely and normally based at least on angle information coming from said angle sensor; and a projection control block for controlling projection of said laser beam based on fault detection information coming from said fault detection block;

a detection sensor for detecting signals output by the projection control block;

an overall control block for supplying a shield control signal to the projection control block;

a motor driver receiving signals from the overall control block; and a scanner motor for rotating the scanning mirror of the scanner as instructed by said motor driver, said angle sensor attached to said scanner moror for driving the scanner and sensing rotation angles of the motor to determine the angle of scanner mirror rotation to provide a signal representing the detected angle to the fault detection block; and wherein said projection control block controls modulation levels of the light modulator.

* * * * *

UNITED STATES PATENT AND TRADEMARK OFFICE
CERTIFICATE OF CORRECTION

PATENT NO. : 7,068,408 B2  Page 1 of 1
APPLICATION NO. : 11/113280
DATED : June 27, 2006
INVENTOR(S) : Yoshitsugu Sakai et al.

It is certified that error appears in the above-identified patent and that said Letters Patent is hereby corrected as shown below:

Column 14:
Line 57 "moror" should read -- motor --.

Signed and Sealed this

Twenty-sixth Day of February, 2008

JON W. DUDAS
*Director of the United States Patent and Trademark Office*